United States Patent [19]

Ookubo et al.

[11] Patent Number: 5,079,973
[45] Date of Patent: Jan. 14, 1992

[54] HYDRAULIC SPEED CHANGE STAGE CONTROL SYSTEM

[75] Inventors: Masahiro Ookubo; Hirofumi Shiba, both of Neyagawa, Japan

[73] Assignee: Kabushiki Kaisha Daikin Seisakusho, Neyagawa, Japan

[21] Appl. No.: 460,056

[22] PCT Filed: Jun. 2, 1989

[86] PCT No.: PCT/JP89/00562
§ 371 Date: Jan. 26, 1990
§ 102(e) Date: Jan. 26, 1990

[87] PCT Pub. No.: WO90/00232
PCT Pub. Date: Jan. 11, 1990

[30] Foreign Application Priority Data

Jun. 27, 1988 [JP] Japan .................. 63-158343

[51] Int. Cl.$^5$ ............................................ B60K 41/06
[52] U.S. Cl. .............................. 74/869; 74/878; 74/866
[58] Field of Search ............ 74/866, 867, 868, 869, 74/878

[56] References Cited

U.S. PATENT DOCUMENTS

| | | | |
|---|---|---|---|
| 3,937,105 | 2/1976 | Arai et al. ................ | 74/866 X |
| 4,467,427 | 8/1984 | Magnusson ............... | 74/866 X |
| 4,488,457 | 12/1984 | Nishimura et al. ....... | 74/878 X |
| 4,631,984 | 12/1986 | Jones ........................ | 74/878 |
| 4,829,853 | 5/1989 | Sakaguchi ................. | 74/868 X |
| 4,846,022 | 7/1989 | Ito et al. ................... | 74/878 X |
| 4,942,782 | 7/1990 | Kumayama et al. ...... | 74/866 |

FOREIGN PATENT DOCUMENTS

| | | |
|---|---|---|
| 52-22658 | 2/1977 | Japan . |
| 52-43066 | 4/1977 | Japan . |
| 55-32941 | 8/1980 | Japan . |
| 57-29290 | 6/1982 | Japan . |
| 1-98741 | 4/1989 | Japan ........... 74/878 |

*Primary Examiner*—Leslie A. Braun
*Assistant Examiner*—Benjamin Levi
*Attorney, Agent, or Firm*—Armstrong, Nikaido, Marmelstein, Kubovcik & Murray

[57] ABSTRACT

A shift limiting valve (110) driven by a control solenoid valve controlled by an electronic control means (40) is installed between a manual shift valve (50) working in cooperation with speed-change operation of driver and shift valves (60) and (62) driven by solenoid valves (S1) and (S2) controlled by the electronic control means (40). The control solenoid valve is controlled by the electronic control means (40) to actuate the shift limiting valve (110) when a vehicle is moving forward at a specified or higher speed so that a planetary gear transmission (12) is not changed to a reverse drive stage even if the driver changes a drive mode to the reverse drive stage.

5 Claims, 6 Drawing Sheets

ND GEAR STAGE CONTROL SYSTEM

DESCRIPTION

1. Technical Field

This invention relates to an electronically controlled hydraulic speed change stage control system equipped in an automatic transmission.

2. Background Art

In a general automatic transmission, speed is changed by a shift tower manually operated by a driver. This shift tower is so designed that speed change stages P-R-N-D-2—1 are arranged in line and the shift tower can not be shifted to P-range position (parking) and R-range position (reverse) if a push button of the shift tower is not pushed, so as to avoid selection of P-range or R-range position due to maloperation when a vehicle is moving forward.

However, some drivers have a bad habit of shifting the shift tower while pushing the push button even during forward driving. And, in this case, fail-safe function does not work for preventing the shifting to P-range or R-range position by the use of the push button during forward driving.

Even in 2-range or 1-range position provided for fixing the speed-change stage, it is desirable that the electronic control is enabled.

In the event of failure in the electronic control, it is desirable that the speed-change stage is fixed to second speed mode in 2-range position and to first speed mode in 1-range position even if, for example, a power source for electronic control is turned off.

DISCLOSURE OF THE INVENTION

This invention provides a hydraulic speed change stage control system, in which a planetary gear transmission is installed at a rear stage of a torque converter transmitting an engine power through means of fluid and the planetary gear transmission is hydraulically controlled by an electronic control means working in cooperation with speed-change operation of driver; characterized by that a shift limiting valve driven by a control solenoid valve controlled by the electronic control means is installed between a manual shift valve working in cooperation with the speed-change operation of the driver and shift valves driven by solenoid valves controlled by the electronic control means, and the control solenoid valve is controlled by the electronic control means to actuate the shift limiting valve when a vehicle is moving forward at a specified or higher speed so that the planetary gear transmission is not changed to a reverse drive mode even if the driver changes a drive stage to the reverse drive mode.

Since oil passages are closed by the shift limiting valve in the above-mentioned structure, the planetary gear transmission is not changed to the reverse drive mode under a state where the vehicle is moving forward at a specified or higher speed. Accordingly, the fail-safe function also works on the maloperation of shifting to R-range position with the push button being pushed during the forward driving Under the state where the vehicle is moving forward at a specified or higher speed, even if the driver changes the drive mode to the second or first speed stage, the planetary gear transmission is not changed directly to the second or first speed but the electronic control means carries out a speed change control appropriate for the second or first speed. Therefore, an objective zone of electronic control is enlarged so that shifting down is avoided and excessive engine braking or engine overrunning is prevented.

When the electronic control means does not send a control signal to the control solenoid valve and the shift limiting valve does not work, the planetary gear transmission is changed according to driver's speed change operation. Therefore, the drive mode can be changed to any speed change stage by operating the shift tower in case for example when the electronic control means breaks down to become incapable of sending an output signal.

Further, when a line pressure control solenoid valve is utilized also as the foregoing control solenoid valve, it becomes unnecessary to specially install the control solenoid valve so that this measure provides economical structure.

BEST MODE FOR CARRYING OUT THE INVENTION

Figure 1:
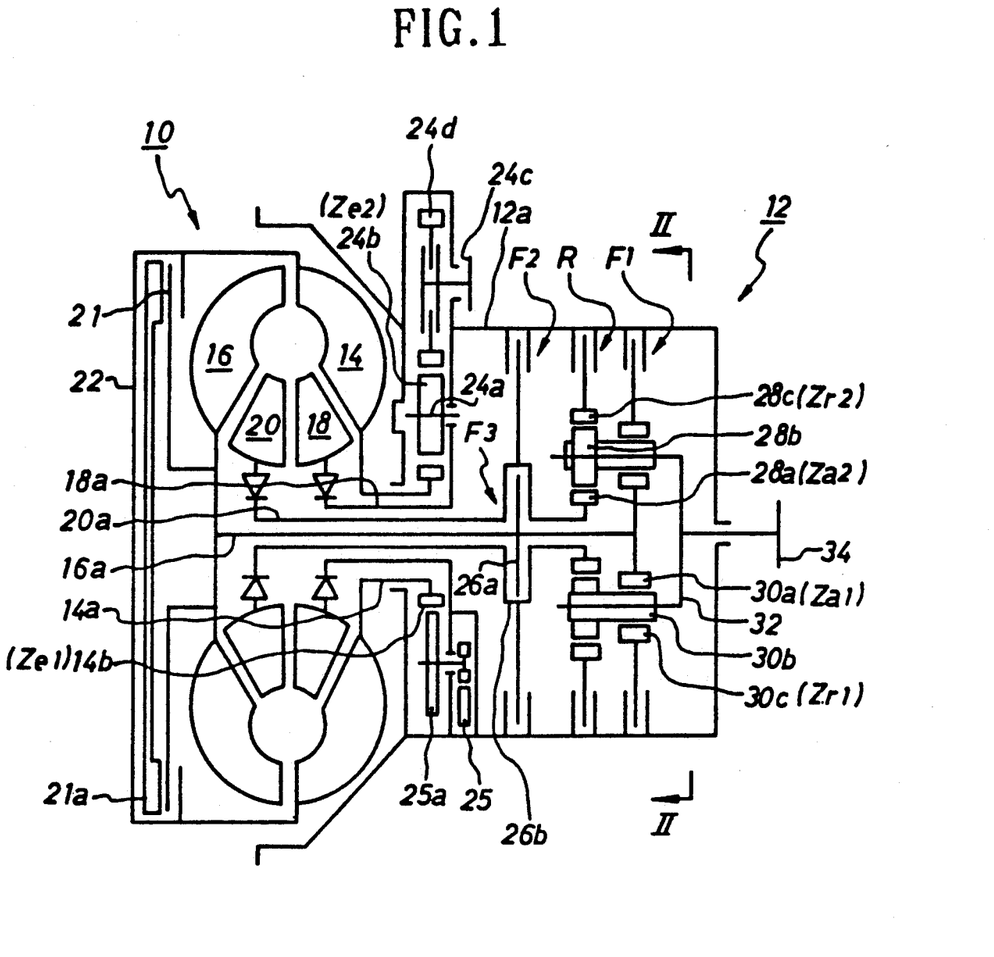
FIG. 1 is a schematic structural diagram of an automatic transmission in an embodiment of this invention.

In FIG. 1 showing an embodiment wherein this invention is applied to an automatic transmission for commercial vehicles such as a truck etc., 10 is a 4-element 2-stage type torque converter. A transmission 12 with forward three-speed and backward one-speed is coupled to a rear stage of the torque converter 10. The transmission 12 has a planetary gear train consisting of a first planetary gear 30b and a second planetary gear 28b, which share one planetary carrier 32, and has a clutch F3 and a brakes F1, F2 and R. The automatic transmission is composed of the transmission 12, the torque converter 10 and a hydraulic speed change stage control system which will be described later in details.

The torque converter 10 consists of a pump 14, a turbine 16, a fixed stator 18, a reversing stator 20 and a lock-up clutch 21; and is designed to transmit an engine power from a front cover 22 to the pump 14.

A piston 21a is installed slidingly between the lock-up clutch 21 and the front cover 22, and the converter is of a so-called pressure piston type wherein both surfaces of the lock-up clutch 21 form torque transmission surfaces when the piston 21a is slid by hydraulic force toward the lock-up clutch 21.

The turbine 16 is coupled to a turbine shaft 16a, and the reversing stator 20 is coupled to a stator shaft 20a. The fixed stator 18 is secured to a housing 12a through a shaft 18a, and the pump 14 is coupled to a pump shaft 14a. A ring gear 14b is fitted to the pump shaft 14a at the transmission 12 side end, and a tooth number of the ring gear 14b is set to Ze1.

The ring gear 14b meshes with a gear 24b (tooth number: Ze2) of an intermediate shaft 24a disposed on top of the housing 12a, and the gear 24b meshes with a gear 24d of a PTO (Power Take Off) shaft 24c. A charging pump 25 forming a hydraulic source is installed at a lower part of the housing 12a, and the charging pump 25 is designed to be driven by a drive gear 25a meshing with the ring gear 14b.

A clutch disc 26a of the clutch F3 for third speed drive is installed in a midway of the turbine shaft 16a. A clutch cover 26b for the clutch F3 is coupled to the stator shaft 20a. The brake F2 for second speed drive is disposed at outer peripheral side of the clutch cover 26b, and the brake F2 is secured to the housing 12a.

A second sun gear 28a (tooth number: Za2) is fitted to an end of the stator shaft 20a, and a first sun gear 30a (tooth number: Za1) is fitted to an end of the turbine shaft 16a. The first sun gear 30a meshes with the first planetary gear 30b, and the second sun gear 28a meshes with the second planetary gear 28b.

A first ring gear 30c (tooth number: Zr1) is provided at an outside of the first planetary gear 30b, and the first ring gear 30c meshes with the first planetary gear 30b. The brake F1 for first speed drive secured to the housing 12a is disposed at a further outside of the first ring gear 30c.

A second ring gear 28c (tooth number: Zr2) meshes with the second planetary gear 28b at its outside, and the brake R for reverse drive is disposed at a further outside of the second ring gear 28c. The brake R is secured to the housing 12a.

Figure 2:
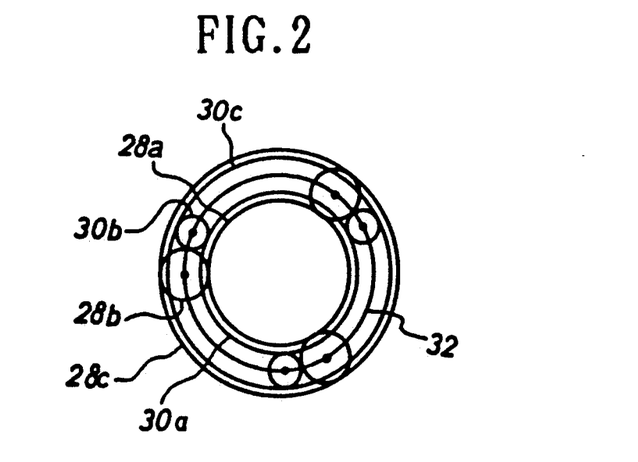
FIG. 2 is a sectional view taken along a line II—II of FIG. 1.

The first planetary gear 30b and the second planetary gear 28b are carried by the planetary carrier 32 in such a way as meshing rotatably each other, as shown by FIG. 2. An output shaft 34 is coupled to the planetary carrier 32.

The transmission 12 can produce reduction ratios as listed in Table 1 by selectively actuating the clutch F3 or the brakes F2, F3 and R. Incidentally, ◯ marks in Table 1 indicate actuated states of the clutch F3 and the brakes F1, F2 and R.

TABLE 1

| Shift | F1 | F2 | F3 | R | Reduction ratio |
|---|---|---|---|---|---|
| Forward drive | | | | | |
| First speed | ◯ | | | | $\frac{Za1 + Zr1}{Za1} > 2$ |
| Second speed | | ◯ | | | $2 > \frac{Za1 + Za2}{Za1} > 1$ |
| Third speed | | | ◯ | | 1 |
| Reverse drive | | | | ◯ | $-\frac{Zr2 + Za1}{Za1}$ |

Figure 3:
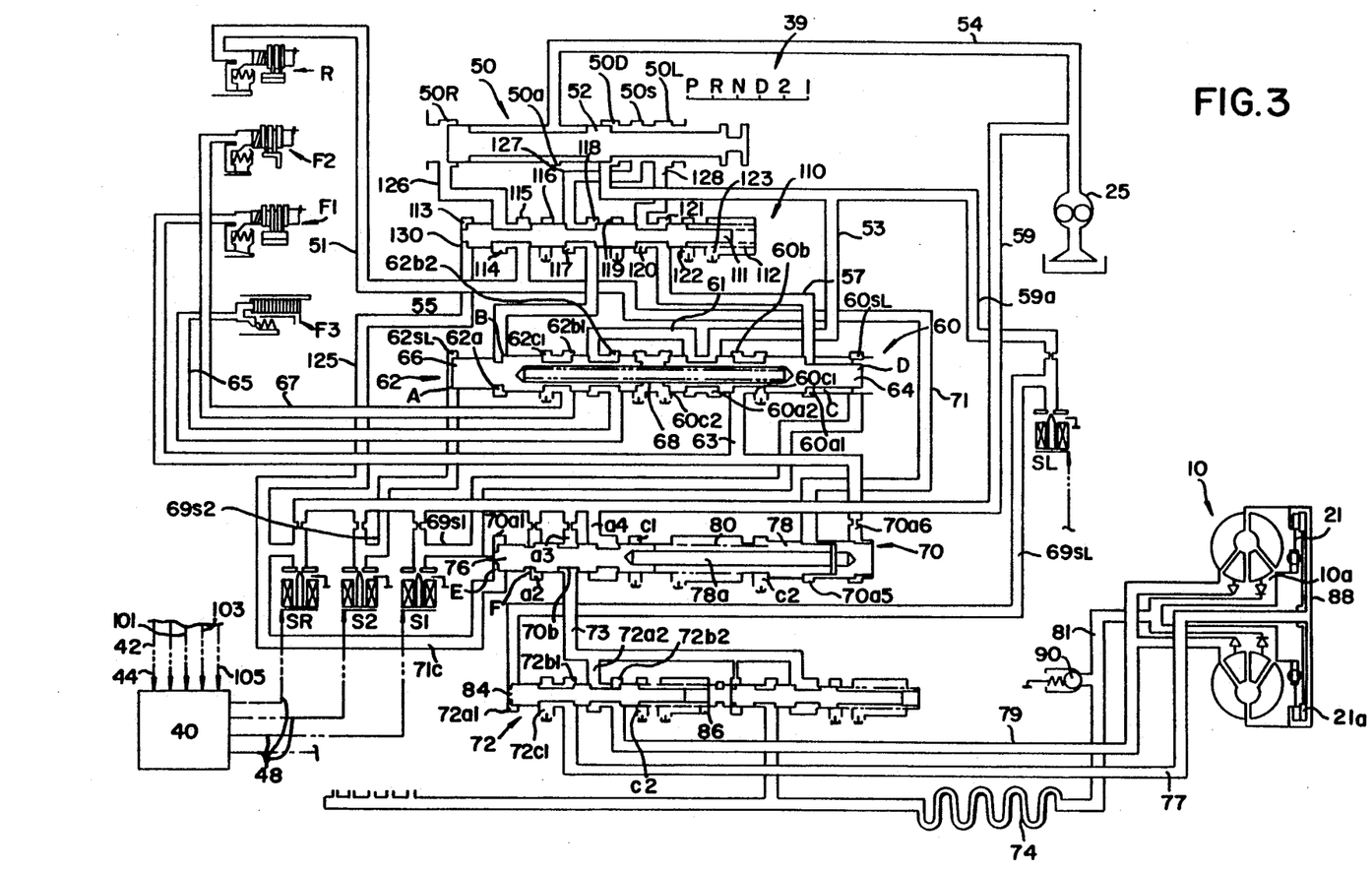
FIG. 3 is a piping system diagram for a hydraulic speed change stage control system.

The hydraulic speed change stage control system, which controls engaging and disengaging of the clutch F3 and the brakes F1, F2 and R by means of hydraulic force from the charging pump 25 as listed in Table 1, will be described hereunder. In FIG. 3 which is the piping system diagram of the hydraulic speed change stage control system; P-range on a selected position indicator panel 39 for indicating selected position of a not-shown shift tower operated manually by driver represents a parking stage, R-range represents a reverse drive stage, and N-range represents a neutral stage D-, 2- and 1-ranges represent automatic speed change stages appropriate for D-, 2- and 1-range positions controlled by a micro computer 40 working as the electronic control means.

Drive condition signals such as a vehicle speed signal 42 and a throttle opening signal 44 etc. have been entered in the micro computer 40, and the micro computer 40 is designed to compare a previously memorized automatic speed change schedule with the vehicle speed signal 42 and the throttle opening signal 44 etc. and decide a most suitable speed stage for the drive condition so as to give an output signal 48.

Figure 4:
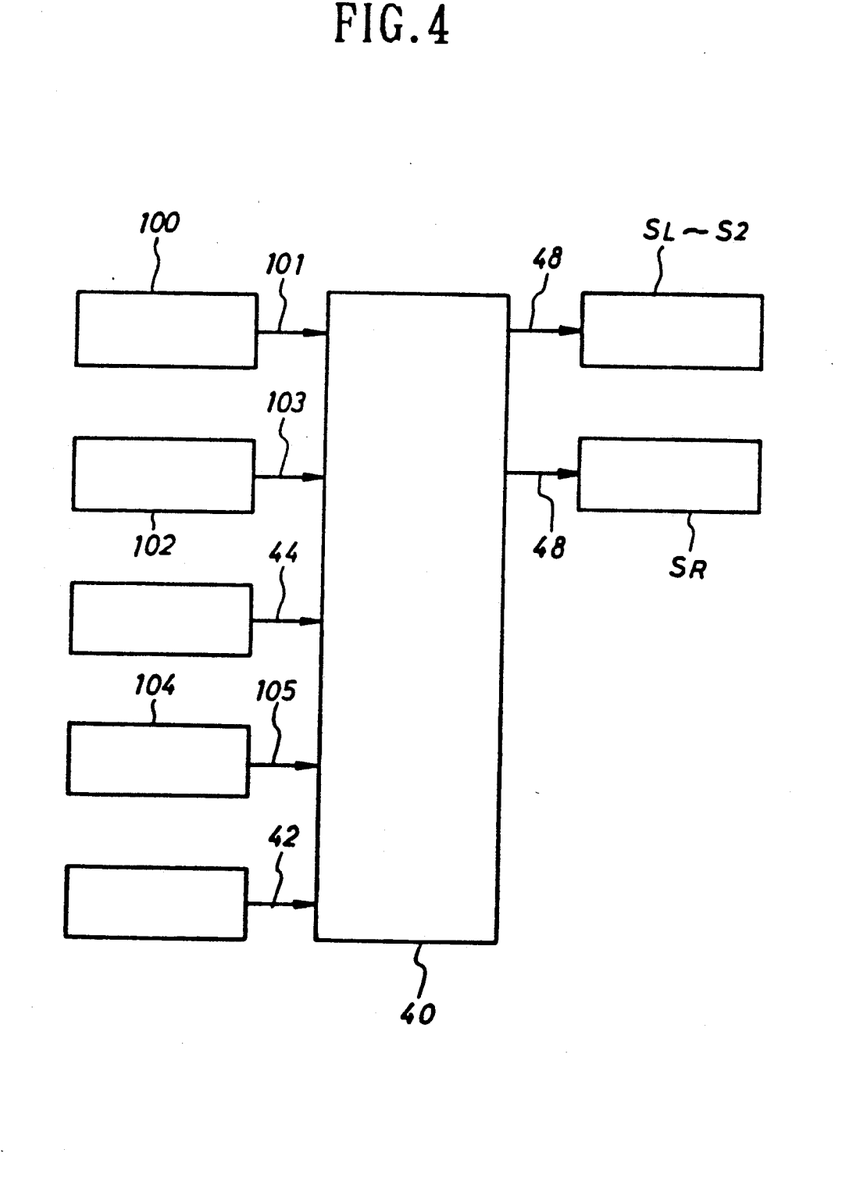
FIG. 4 is a block diagram of electric circuit for the hydraulic speed change stage control system.
Figure 5:
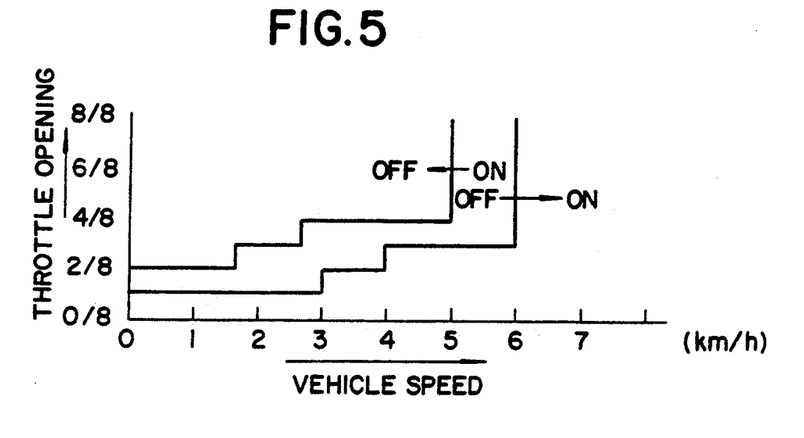
FIG. 5 is an explanatory diagram of line pressure control map under first speed stage of the hydraulic speed change stage control system.
Figure 6:
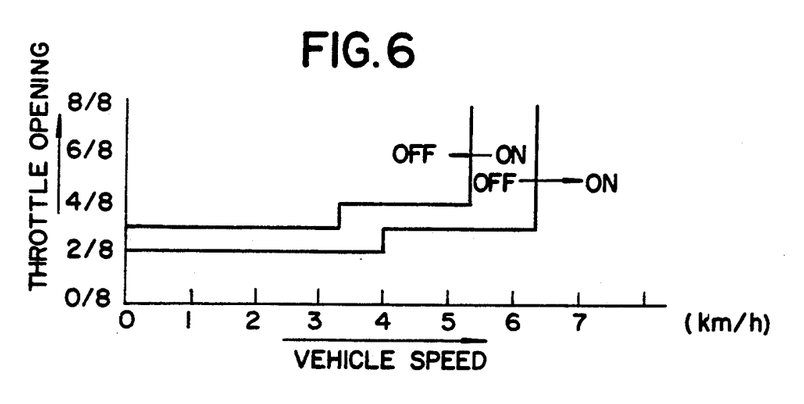
FIG. 6 is an explanatory diagram of line pressure control map under second speed stage of the hydraulic speed change stage control system.
Figure 7:
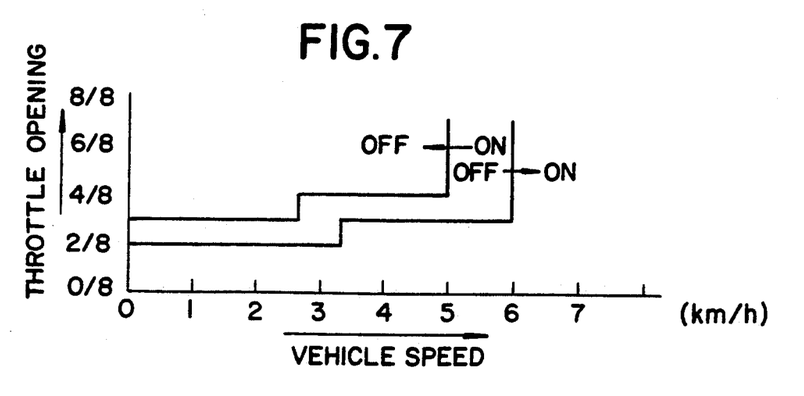
FIG. 7 is an explanatory diagram of line pressure control map under third speed stage of the hydraulic speed change stage control system.

Detection signals such as a brake signal 101 from a brake pedal switch 100, an accelerator signal 103 from an accelerator switch 102 and a shift position signal from a shift lever switch 104, have been entered in the micro computer 40 as shown by FIG. 4, in addition to the vehicle speed signal 42 and the throttle opening signal 44.

In addition to the foregoing speed change schedule, line pressure control maps diagrammed in FIG. 5 through FIG. 8 and shift maps adapted to 2-position and 1-position which will be described later in details, have been memorized in the micro computer 40 previously. In FIG. 5 through FIG. 8, an axis of abscissa represents the vehicle speed and an axis of ordinate represents the throttle opening. The line pressure control maps in FIG. 5 through FIG. 8 show timings where a line pressure control solenoid valve SR described later turns from ON to OFF and from OFF to ON in each speed change stage in relation to the vehicle speed and the throttle opening. The line pressure becomes high when the solenoid valve SR turns on and becomes constant when the solenoid valve turns off.

Namely, the micro computer 40 is designed to detect the drive condition of vehicle and operating stage of driver and compare them with respective maps of FIG. 5 through FIG. 8 so as to output the most suitable signal 48 to solenoid valves S1, S2, SR and SL on the basis the vehicle speed signal 42, throttle opening signal 44, brake signal 101, accelerator signal 103 and shift position signal 105.

The output signal 48 is sent to the solenoid valves S1, S2, SR and SL which are designed to actuate only when the output signal 48 is outputted. The solenoid valves S1 and S2 are for the first speed and second speed respectively, the solenoid valve SR is for controlling the line pressure, and the solenoid valve SL is for the lock-up clutch 21.

The shift tower is interconnected to a spool 52 of a manual valve 50 through a not-shown link mechanism, and a passage 54 permitting pressure oil to flow from the charging pump 25 is connected to an inflow port 50a of the manual valve 50. A D-range port 50D, a 2-range port 50S, an L-range port 50L and an R-range port 50R which are all opened or closed by the spool 52, are made on the manual valve 50. These ports are so positioned that only the D-range port 50D is opened when D-range position is selected; both the D-range port 50D and the 2-range port 50S are opened when the 2-range position is selected; and all the D-range port 50D, the 2-range port 50S and the L-range port 50L are opened when the L-range position is selected.

A shift limiting valve 110 which is an essential part of this invention is installed between the manual valve 50 and both shift valves 60 and 62. In the shift limiting valve 110, a spool 111 is urged toward left side by a return spring 112. Ports 113 through 123 are formed on the shift limiting valve 110 in turn from a left end. A passage 125 communicates to the port 113, and the solenoid valve SR is installed in the passage 125. The R-range port 50R of the manual valve 50 communicates with the port 114 through a connecting passage 126. The port 115 communicates with the brake R through a passage 51, and a passage 71 branches off from the passage 51. The 2-range port 50S communicates with the port 117 through a connecting passage 127, and the L-range port 50L communicates with the port 120 through a connecting port 128.

A passage 55 is connected to the port 118, and the passage 55 is connected to an inflow port 62a of the second shift valve 62. A passage 57 is connected to the port 121, and the passage 57 is connected to an inflow port $60_{a1}$ of a first shift valve 60.

Therefore, a pressure in the passage 125 rises from 0 kg/cm$^2$ to a line pressure when the solenoid valve SR is actuated. This line pressure acts on a pressure surface E of a spool 76 of a main regulating valve 70, and the spool 76 is moved toward right side by hydraulic force to lower the line pressure. As soon as the line pressure lowers, hydraulic force acting from the passage 125 on a pressure surface 130 of a spool 111 causes the spool 111 to slide toward right side. Consequently, the connecting passages 126, 127 and 128 are blocked by the spool 111.

On the other hand, when the solenoid valve SR is released; the pressure in the passage 125 becomes 0 kg/cm$^2$, the hydraulic force does not act on the pressure surface E of the spool 76 of the main regulating valve 70, the spool 76 is pushed only by a hydraulic force acting on the pressure surface F, so that the line pressure rises. Since the pressure in the passage 125 is 0 kg/cm$^2$ under this state, the spool 111 is moved by the return spring 112 toward left side.

In the D-, 2- and 1-range positions; pressure oil always flows from the port 50D of the manual shift valve 50 to the both shift valves 60 and 62 while bypassing the shift limiting valve 110 through the passage 53. Accordingly, the micro computer 40 controls the solenoid valves S1 and S2 to attain an optimum speed change stage even when the passages 126, 127 and 128 are blocked simultaneously.

In the N-range position, pressure oil does not flow to the passage 53 so that it does not flow in the brakes F1, F2 and R and the clutch F3. Therefore, the drive stage becomes neutral.

The first shift valve 60 and the second shift valve 62 are installed on the same axis in series. A single return spring 68 is interposed between a spool 64 of the first shift valve 60 and a spool 66 of the second shift valve 62, and the return spring 68 urges the both spools 64 and 66 toward both sides.

The inflow ports $60_{a1}$ and $60_{a2}$, an outflow port $60b$, a solenoid port $60_{SL}$ and drain ports $60_{c1}$ and $60_{c2}$ are made on the first shift valve 60. The inflow port 62a, outflow ports $62_{b1}$ and $62_{b2}$, a solenoid port $62_{SL}$ and drain ports $62_{c1}$ and $62_{c2}$ are made on the second shift valve 62. A 1-2 shift valve port 61 connecting the both shift valves 60 and 62 is installed.

Areas of pressure surfaces formed on the both spools 64 and 66 are so determined as to satisfy the following relationship:

$$A>D, C>B, A>C-B, B>D \qquad [1]$$

where A is an area of pressure surface corresponding to the solenoid port $62_{SL}$, B is an area of pressure surface corresponding to the inflow port 62a, C is an area of pressure surface corresponding to the inflow port $60_{a1}$, and D is an area of pressure surface corresponding to the solenoid port $60_{SL}$.

A main spool 76 and auxiliary spools 78 and 78a are disposed in the same axis in the main regulating valve 70 for regulating hydraulic pressure, and a pressure regulating spring 80 is interposed between the both spools 76 and 78. Two pressure surfaces E and F are formed on the main spool 76 of the main regulating valve 70 in this order from the left end. On the main regulating valve 70, there formed six inflow ports $70_{a1}$, $70_{a2}$, $70_{a3}$, $70_{a4}$, $70_{a5}$, and $70_{a6}$ and an outflow port $70b$ and drain ports $70_{c1}$ and $70_{c2}$. In FIG. 3, the number 70 is omitted from these signs and abbreviated merely to c1, c2 etc. at places where spaces are so small that the signs can not be written thereon.

A spool 84 is installed freely slidingly in a lock-up control valve 72 in such a way as urged toward left side by a return spring 86. Inflow ports $72_{a1}$ and $72_{a2}$, outflow ports $72_{b1}$ and $72_{b2}$, and drain ports $72_{c1}$ and $72_{c2}$ are made on the lock-up control valve 72.

Piping systems for the foregoing valves will be described hereunder. The R-range port 50R of the manual valve 50 intercommunicates to the brake R for reverse drive through the connecting passage 126 and the passage 51, and a passage 71 branches off from a midway of the passage 51. The passage 71 communicates with the outflow port $70_{a5}$ of the main regulating valve 70 so as to push the auxiliary spool 78a toward left side by means of hydraulic force exerted from the passage 71, when necessary, to raise a setting value of the main regulating valve 70.

The D-range port 50D and the inflow port $60_{a2}$ communicate each other through the passage 53, the port 118 and the inflow port 62a communicate each other through the passage 55, and the port 121 and the inflow port $60_{a1}$ communicate each other through the passage 57.

The outflow port $60b$ of the first shift valve 60 communicates to the brake F1 for first speed drive through the passage 63, the passage 63 branches off from its midway to communicate with the inflow port $70_{a6}$ of the main regulating valve 70, so as to push the auxiliary spool 78 toward left side to raise the setting pressure. The outflow port $62_{b1}$ of the second shift valve 62 communicates to the brake F2 for second speed drive through the passage 67, and the outflow port $62_{b2}$ communicates to the clutch F3 for third speed drive through the passage 65.

The passage 59 branches off from a midway of the passage 54, and the passage 59 branches into three passages to communicate to the solenoid valves SR, S1 and S2 respectively. The solenoid valve SL is installed in the passage 59a. Throttles are formed on branched parts of the passage 59, and drain ports are made in respective solenoid valves SR, S1, S2 and SL.

One end of a passage $69_{S2}$ is connected to the solenoid port $62_{SL}$ of the second shift valve 62, and the other end of the passage $69_{S2}$ is connected to the passage 59 neighboring the solenoid valve S2. One end of a passage $69_{S1}$ is connected to the solenoid port $60_{SL}$ of the first shift valve 60, and the other end of the passage $69_{S1}$ is connected to the passage 59 neighboring the solenoid valve S1. A passage $69_{SL}$ is provided between the inflow port $72_{a1}$ of the lock-up control valve 72 and the passage 59 neighboring the solenoid valve SL.

The inflow ports $70_{a2}$ through $70_{a4}$ of the main regulating valve 70 communicate to the passage 59. Throttles for controlling chattering of the spool 76 are formed in the vicinities of the inflow ports $70_{a2}$ and $70_{a3}$. The inflow port $70_{a1}$ communicates to a passage 71c which in turn communicates to the passage 125. The outflow port 70b communicates to the inflow port $72_{a2}$ of the lock-up control valve 72 through the passage 73.

The outflow port $72_{b1}$ of the lock-up control valve 72 communicates to an oil chamber 88 of the torque converter 10 through a passage 77, and a passage 79 connected to the outflow port $72_{b2}$ communicates to a torque converter passage 10a.

One end of a discharge passage 81 is connected to the torque converter passage 10a, and a part of working oil is supplied as lubricating oil to friction members of the brakes F1, F2 and R and the clutch F3 of the transmission 12 from the other end of the discharge passage 81. A check valve 90 and an oil cooler 74 are installed in a midway of the discharge passage 81.

Figure 9:
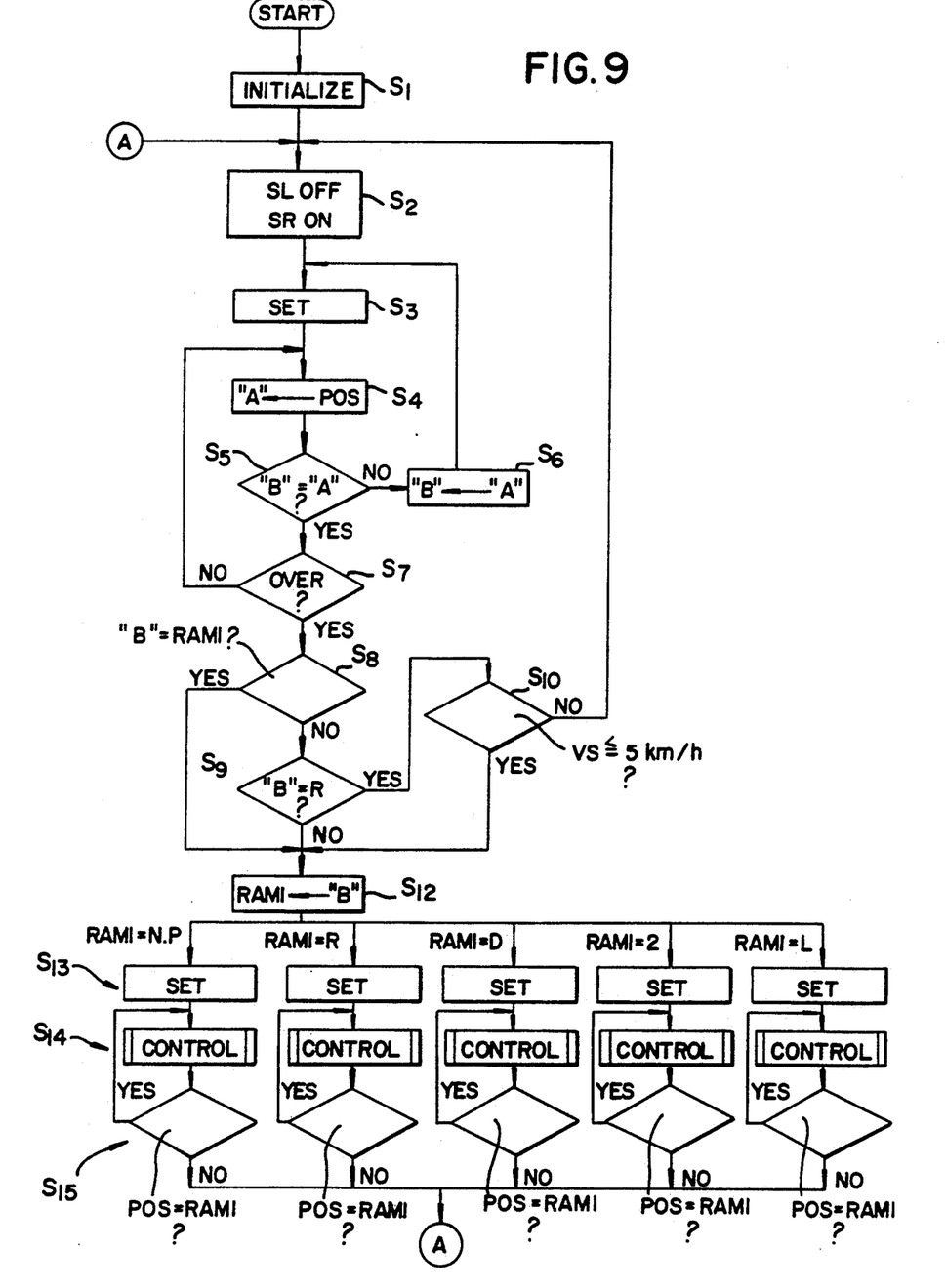
FIG. 9 a flow chart showing a function of micro computer serving as the electronic control means for the hydraulic speed change stage control system.

Speed change control function of the computer 40 will be described hereunder with reference to the flow chart of FIG. 9. A RAM (random access memory) of the micro computer 40 is first checked in Step S1, then inflow and outflow ports and RAM are initialized to initial values. Control step proceeds to Step S2 where the signal 48 is outputted for deenergizing a not-shown exhaust brake solenoid valve and the solenoid valve SL and energizing the solenoid valve SR. It proceeds to Step S3 where a waiting timer is set to 0.3 seconds, for example. It proceeds to Step S4 where the shift position signal 105 is read out and stocked in A-register. It proceeds to Step S5 where content of A-register is compared with that of B-register. It then proceeds to S7 if the content of A-register is identical with that of B-register, but it returns to Step S4 if the waiting timer has not counted down the time which has been set in Step S3. It proceeds to Step S6 if the content of A-register is different from that of B-register in Step S5, the content of A-register is stocked in B-register, then it returns to Step S3. If the timer has counted down the time in Step S7, it proceeds to Step 8 where the content of B-register is compared with that of RAM1. If they are identical, it proceeds to S12 where the content of B-register is written in RAM1. It then proceeds to Steps S13 and S14 to permit the automatic transmission to carry out suitable speed change operation according to the shift position signal written in RAM1.

If the content of B-register differs from that of RAM1, it proceeds to Step S9 where judgment is done whether or not the content of B-register is R-range. If the content is R-range, it proceeds to Step S10 where judgment is done whether or not the vehicle speed is equal to or lower than the specified value of 5 km/h. It returns to Step S2 if the vehicle speed exceeds 5 km/h, so that R-range control is not carried out and the solenoid valve SR is not released.

If the vehicle speed is equal to or lower than 5 km/h in Step S10, it proceeds to Steps S12, S13 and S14 where control for shifting to R-range is carried out.

If the content of B-register is not R-range in Step S9, it proceeds to step S12, S13 and S14 to permit the automatic transmission to carry out suitable speed change operation according to the shift position signal.

In Step S15, judgment is done whether or not the shift lever has been shifted, and it returns to Step S2 if the lever has been shifted.

Function will be described hereunder. The speed change operation is carried out in the transmission 12 by selectively actuating the brakes F1, F2 and R and the clutch F3 as listed in Table 1.

The electronically controlled hydraulic system which feeds hydraulic force for speed change of the transmission 12, functions as follows.

When N-range position is selected, pressure oil from the charging pump 25 does not flow from the manual valve 50 to the clutch F3 and the brakes F1, F2 and R because the manual valve 50 is closed. On the other hand, pressure oil which was pressure regulated by the main regulating valve 70 and passed the inflow port $72_{a2}$ of the lock-up control valve 72, is always fed to the torque converter 10.

When R-range position is selected, the spool 52 of the manual valve 50 moves toward left side to permit the inflow port 50a to communicate with the R-range port 50R. Therefore, under a state where the spool 111 of the shift limiting valve 110 is at the left end position, pressure oil from the charging pump 25 flows from the passage 54 through the connecting passage 126 to the passage 51 so as to exert hydraulic force on the brake R for reverse drive and actuates it.

In P-range position, the spool 52 moves further toward left side to close the inflow port 50a so that a not-shown parking gear is meshed to lock the output shaft 34.

When D-range position is selected, the speed change stage is automatically selected according to an automatic speed change program stored in the micro computer 40.

In D-range position, the spool 52 of the manual valve 50 moves toward right side to permit the inflow port 50a to communicate with the D-range port 50D. Under this state, pressure oil from the charging pump 25 flows from the passage 54 to the passage 53, and through the inflow port $60_{a2}$ of the first shift valve 60 and the 1-2 shift valve port 61 to the outflow port $62_{b2}$ of the second shift valve 62, then through the passage 65 to the clutch F3 for third speed drive, and the oil actuates the clutch F3. Accordingly, if the output signal 48 from the micro computer 40 is stopped when D-range position is selected, the speed mode is changed to the third speed drive stage.

Pressure oil fed from the passage 59 to the solenoid valves S1, S2 and SR is drained from the drain port when the solenoid valves S1, S2 and SR are opened.

When D-range position is selected and the vehicle is stopped, the vehicle speed signal 42 becomes zero level so that the micro computer 40 judges the control state as ready for start and sends the output signal 48 to the solenoid valve S1 for first speed drive. Under this state, the drain port of the solenoid valve S1 is closed so that pressure oil fed from the passage 59 flows through the passage $69_{S1}$ to the solenoid port $60_{SL}$ of the first shift valve 60. The spool 64 is moved toward left side by pressure oil from the solenoid port $60_{SL}$ against a spring force of the return spring 68, right end of the spool 66 strikes against left end of the spool 64, so that the inflow port $60_{a2}$ communicates with the outflow port $60b$ of the first shift valve 60.

On the other hand, the 1-2 shift valve port 6 communicates to the drain port $60_{c2}$ so that pressure oil from the passage 65 is drained from the drain port $60_{c2}$. Therefore, the clutch F3 is released and the brake F1 is actuated by hydraulic force from the passage 63, and the drive mode is thus changed to the first speed drive.

When the vehicle speed increases by and by to reach a second speed zone, the micro computer 40 outputs the output signal 48 only to the solenoid valve S2 for second speed drive to open the solenoid valve S1. Under this state, pressure oil from the passage 59 flows through the passage $69_{S2}$ to the solenoid port $62_{SL}$ of the second shift valve 62. The hydraulic force from the solenoid port $62_{SL}$ causes the spool 66 to move toward right side against a spring force of the return spring 68 to push the spool 64 toward right side. When the both spools 64 and 66 move integrally toward right side and a right end of the spool 64 strikes against a right side of wall, the 1-2 shift valve port 61 communicates with the outflow port $62_{b1}$ and pressure oil from the passage 53 is fed through the 1-2 shift valve port 61 and the passage 67 to the brake F2 for second speed drive.

While, the inflow port $60b$ of the first shift valve 60 communicates to the drain port 60c1, the brake F1 is released, and the shifting operation from the first to second speed drive is thus completed.

When the vehicle speed increases to reach a third speed zone, the output signal 48 sent from the micro computer 40 to the solenoid valves S1 and S2 becomes zero level to accomplish a third speed stage.

When this D-range position is selected, the micro computer 40 compares the previously stored shift maps with the vehicle speed signal 42, the throttle opening signal 44, the brake signal 101, the accelerator signal 103 and the shift position signal 105 so as to give the output signal 48 for selecting an optimum speed change stage.

Driving in the above-mentioned D-range position will cause no trouble under a normal drive condition, however, 2-range position is to be selected when a high driving torque is required as in case of driving a steep slope or when an intentional strong engine braking is required in case of driving a down slope.

In 2-range position, the spool 52 of the manual valve 50 moves further toward right side to cause the inflow port 50a to communicate with the D-range port 50D and 2-range port 50S.

The shift limiting valve 110 has not only a function to limit working oil flowing into the brake R but a function to limit working oil flowing into the ports $60_{a1}$ and $60_{a2}$ of the both shift valves 60 and 62. Following troubles during driving can be avoided by the foregoing function.

Conventional systems include a disadvantage that excessive engine braking or engine overrunning occurs when the shift tower is shifted to 2-range position during high-speed driving at the third speed drive stage, because 2-range is in fixed-to-second-speed stage and 1-range is in automatic control stage of first speed and second speed. Further, in case when the shift lever is changed to 1-range position during the high-speed driving at the third speed drive stage, hydraulic pressure acts on the port $60_{a1}$ earlier than on the port $62_{SL}$ even if the output signal 48 from the micro computer 40 actuates the solenoid valve S2, because a passage resistance up to the port $62_{SL}$ is larger than a passage resistance up to the port $60_{a1}$. Therefore, such trouble occurs that hydraulic pressure acts on the port $60_{a1}$ in advance to change the drive mode to the first speed drive stage instantaneously, then hydraulic pressure acting on the port $62_{SL}$ changes the speed mode to the second speed drive stage.

Since the shift maps adapted to 2-range and 1-range are stored in the micro computer 40 in this invention in order to solve the above-mentioned troubles, the micro computer 40 controls the solenoid valves S1 and S2 on the basis of respective shift maps when 2-range or 1-range is selected.

Namely, when a vehicle is running at a specified or larger speed, the shift limiting valve 110 restrains the working oil from flowing to the ports $62a$ and $60_{a1}$ of the both shift valves 60 and 62. Consequently, the both shift valves 60 and 62 works according to the functions of the solenoid valves S1 and S2 in the same way as when D-range position is selected.

In the event when the micro computer 40 breaks down, pressure in the passage 125 becomes 0 kg/cm$^2$ with the power supply turned off, the passages to the brake R and port $62a$ and $60_{a1}$ restrained by the shift limiting valve 110 are opened, and arbitrary speed change stage can be selected from P, R, N, D, 2 and 1 positions by operating the shift tower. Similar state occurs in a drive condition at the specified speed of 5 to 6 km/h or lower.

Function in the lock-up state will be described hereunder. When the lock-up operation is required, the micro computer 40 sends the output signal 48 to the solenoid valve SL. When the solenoid valve SL is actuated by the output signal 48, pressure oil from the passage $69_{SL}$ is fed to the inflow port $72_{a1}$ of the lock-up control valve 72. The spool 84 is slid by hydraulic force exerted from the inflow port $72_{a1}$ toward right side, the inflow port $72_{a2}$ communicates with the outflow port $72_{b1}$, and at the same time the outflow port $72_{b2}$ communicates with the drain port $72_{c2}$. Therefore, pressure oil flowing from the charging pump 25 through the passage 59, the main regulating valve 70 and the passage 73 to the inflow port $72_{a2}$, is fed from the outflow port $72_{b1}$ through the passage 77 to the oil chamber 88 of the torque converter 10. When the piston 21a is pushed by hydraulic force of the oil chamber 88, the lock-up clutch 21 connects the front cover 22 to the turbine 16 and turbine shaft 16a.

Working oil in the torque converter passage 10a is discharged from the passage 79 to the drain port $72_{c2}$, so that working oil in the torque converter passage 10a gradually flows out to reduce a drag (passage resistance) of the torque converter passage 10a by a large margin.

The fail-safe function which is the essential part of this invention will be described hereunder. Under the state where the vehicle is moving forward at a speed of about 5 km/h or higher, the solenoid valve SR is actuated so that the spool 111 of the shift limiting valve 110 is slid toward right side by hydraulic force acting from the passage 125 on the shift valve 110. When the spool 111 slides toward right side, the passages 126, 127 and 128 are blocked by the spool 111.

Accordingly, even when a driver pushes the push button for R-range on the shift tower and shift it to the R-range position by mistake during forward driving, the transmission 12 is not changed to the reverse drive stage at a vehicle speed of 5 km/h or higher and the driver's maloperation is backed up.

Further, when the vehicle speed is approximately 6 km/h or higher, the solenoid valve SR is actuated to raise pressure in the passage 125 up to the line pressure regardless of drive stage position of the shift tower as diagrammed in FIG. 5 through FIG. 8. Therefore, even when the shift tower is changed to 2-range or 1-range position during high speed driving (under a state where the drive mode is automatically changed to the third speed drive stage) at D-range position, working oil in the connecting passages 127 and 128 does not flow and the speed mode is not changed to second or first speed drive stage so that controllability is improved.

As described in the above embodiment, the present invention is applicable not only to the solenoid valve SR for changing the line pressure to two stages: ON and OFF, but to the solenoid valve for so-called a duty control which regulates the line pressure in a stepless manner. In this case, however, a spring force of the return spring 112 of the shift limiting valve 110 must be adapted to a setting duty pressure because the duty pressure of the solenoid valve changes in a stepless manner.

Figure 8:
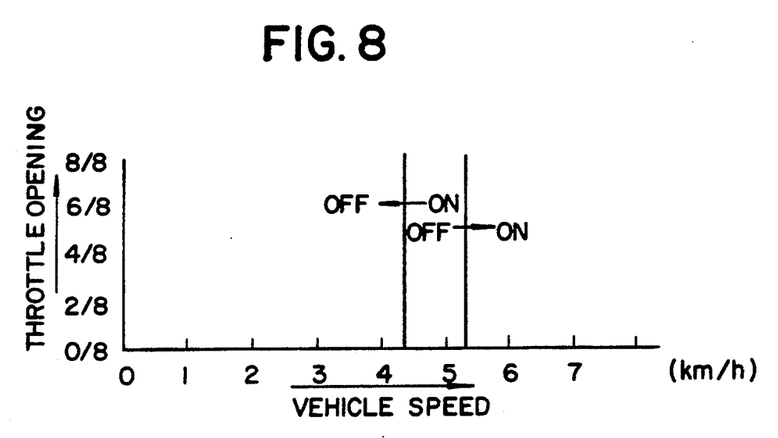
FIG. 8 is an explanatory diagram of line pressure control map under reverse drive stage of the hydraulic speed change stage control system.
Figure 10:
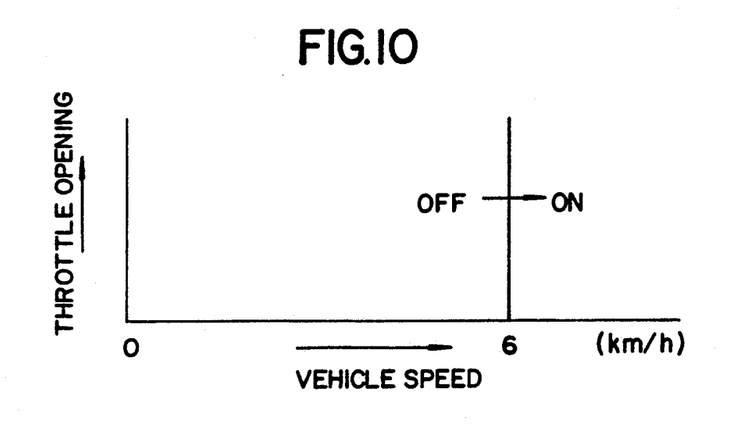
FIG. 10 is an explanatory diagram of line pressure control map under reverse drive stage of a hydraulic speed change stage control system of another embodiment.

In the control map diagrammed in FIG. 8, the drive mode becomes neutral at a speed of 5 to 6 km/h or higher after the vehicle starts in the reverse drive stage. In order to avoid this, the control shift map in R-range may be specified as shown by FIG. 10. In this case, the micro computer 40 determines an operation of shifting to R-range position and carries out a control of holding the determination until the shift tower is shifted from R-range position to another. In the hydraulic speed change state control system for automatic transmission according to the present invention as described above, the shift limiting valve 110 is installed between the manual valve 50 and the first shift valve 60 and second shift valve 62, and the shift limiting valve 110 is controlled by the control solenoid valve such as the solenoid valve SR etc. Therefore, when the control solenoid valve is actuated to raise the pressure in the passage 125 up to the line pressure where the vehicle is moving forward at a specified or higher speed, even if a driver carries out such maloperation as shifting the shift tower to R-range position while pushing the push button thereof, the shift limiting valve 110 blocks the connecting passages 126, 127 and 128 not to permit the working oil to flow into the brake R so that the transmission 12 is prevented from being changed to the reverse drive stage during the forward drive of vehicle. Consequently, even when a driver, who has a bad habit of operating the shift tower while always pushing its push button for selecting the reverse drive stage, shifts the shift tower to R-range position with the push button pushed by mistake during the forward drive of vehicle, the fail-safe function also works.

Under the state where the vehicle is moving forward at a specified or higher speed, the transmission 12 is not changed directly to the second or first speed stage but the computer 40 carries out the speed change control appropriate for the second or first speed stage even when the driver shifts the shift tower to the second or first speed position. Accordingly, the objective zone of electronic control is enlarged so that, even if the shift tower is shifted to the second or first speed stage during the high-speed drive at the third speed stage, the shifting down can be avoided and the excessive engine braking or engine overrunning can be prevented.

Under the state where the vehicle is moving forward at a specified or higher speed, the transmission 12 is not changed to the parking stage even when the driver shifts the shift tower to P-range with its push button being pushed by mistake during forward driving of vehicle, the fail-safe function also works.

When the microcomputer 40 does not send the control signal to the control solenoid valve and the shift limiting valve 110 does not work, the transmission 12 is changed according to the shift tower operation by the driver. Therefore, the speed can be changed to any drive stage by operating the shift tower in case, for example, when the electronic control means breaks down to become incapable of sending the output signal.

Further, when the line pressure control solenoid valve SR is utilized also as the foregoing control solenoid valve, it becomes unnecessary to specially install the control solenoid valve so that this measure provides economical structure.

Industrial Applicability

As described above, the present invention is effectively applicable to the hydraulic speed change stage control system for automatic transmission employed for vehicles etc. in order to improve its function.

While the invention has been particularly shown and described in reference to preferred embodiments thereof, it will be understood by those skilled in the art that changes in form and details may be made therein without departing from the spirit and scope of the invention.

What is claimed is:

1. A hydraulic speed change stage control system for an automatic transmission, comprising:
   a planetary gear transmission installed at a rear stage of a torque converter for transmitting an engine power through means of fluid;
   an electronic control means working in cooperation with speed-change operation of a driver for hydraulically controlling the planetary gear transmission, the electronic control means having transmission shifting characteristics stored therein;
   a shift limiting valve driven by a control solenoid valve controlled by said electronic control means being installed between a manual shift valve and shift valves, the manual shift valve working in cooperation with the speed-change operation of the driver and the shift valves being driven by solenoid valves (S1) and (S2) controlled by said electronic control means, and said control solenoid valve being controlled by said electronic control means based on the transmission shifting characteristics stored within the electronic control means to actuate said shift limiting valve when a vehicle is moving forward at a specified or higher speed so that the planetary gear transmission is not changed to a reverse drive stage even if the driver changes a drive mode to the reverse drive stage, wherein said electronic control means compares vehicle driving condition and said speed-change operation of said driver with said shifting characteristics stored in said electronic control means, said shifting characteristics being a function of at least a throttle opening and a vehicle speed.

2. A hydraulic speed change stage control system for an automatic transmission as set forth in claim 1, wherein the control solenoid valve is controlled by the electronic control means to actuate the shift limiting valve when the vehicle is moving forward at a specified or higher speed so that the planetary gear transmission is not changed to the reverse drive stage even if the driver changes the drive mode to the reverse drive stage, and the planetary gear transmission is not changed directly to a second or first speed drive stage but the electronic control means carries out speed change control appropriate for the second or first speed drive stage even if the driver changes the driver mode to the second or first speed drive stage.

3. A hydraulic speed change stage control system for an automatic transmission as set forth in claim 1, wherein the control solenoid valve is controlled by the electronic control means to actuate the shift limiting valve when the vehicle is moving forward at a specified or higher speed so that the planetary gear transmission is not changed to the reverse drive stage even if the driver changes the drive mode to the reverse drive stage, and the planetary gear transmission is not changed to a parking stage even if the driver changes the drive mode to a parking stage.

4. A hydraulic speed change stage control system for an automatic transmission as set forth in claim 3, wherein the planetary gear transmission is changed according to speed change operation of the driver when a control signal is not sent from the electronic control means to the control solenoid valve so that the shift limiting valve is not actuated.

5. A hydraulic speed change stage control system for an automatic transmission as set forth in any one of claims 1, 2 or 3, wherein a solenoid valve (SR) for controlling line pressure is utilized also as the control solenoid valve.

* * * * *

UNITED STATES PATENT AND TRADEMARK OFFICE
CERTIFICATE OF CORRECTION

PATENT NO. : 5,079,973
DATED : January 14, 1992
INVENTOR(S) : Masahiro OHKUBO et al It is certified that error appears in the above-identified patent and that said Letters Patent is hereby corrected as shown below:

On the cover page, Item [75] "Masahiro Ookubo" should read -- Masahiro Ohkubo --.

Signed and Sealed this

Fifteenth Day of June, 1993

Attest:

MICHAEL K. KIRK

Attesting Officer

Acting Commissioner of Patents and Trademarks